United States Patent [19]
Bonnetin et al.

[11] Patent Number: 6,131,563
[45] Date of Patent: Oct. 17, 2000

[54] LAMINATED GLAZING PANEL, METHOD FOR MAKING SAME, AND METHOD FOR MOUNTING AND USING SAID GLAZING

[75] Inventors: Alain Bonnetin, Coulommiers; Jean-Paul Bauchet, Saint-Cyr-sur-Morin; Michel Cartigny, Mirebeau; Eric Rhetat, Fontaine-les-Dijon, all of France

[73] Assignee: Saint-Gobain Vitrage, Courbevoie, France

[21] Appl. No.: 08/836,666

[22] PCT Filed: Sep. 18, 1996

[86] PCT No.: PCT/FR96/01456

§ 371 Date: Nov. 7, 1997

§ 102(e) Date: Nov. 7, 1997

[87] PCT Pub. No.: WO97/10951

PCT Pub. Date: Mar. 27, 1997

[30] Foreign Application Priority Data

Sep. 21, 1995 [FR] France ................................. 95 11089

[51] Int. Cl.[7] ............................. B32B 17/10; C03C 27/12
[52] U.S. Cl. ........................................ 126/373.1; 428/428
[58] Field of Search .................................. 428/428, 429; 126/373

[56] References Cited

U.S. PATENT DOCUMENTS

| | | |
|---|---|---|
| 2,557,778 | 6/1951 | Barry . |
| 3,061,490 | 10/1962 | Ryan . |
| 3,334,008 | 8/1967 | Park et al. . |
| 3,522,142 | 7/1970 | Wismer et al. . |
| 3,616,839 | 11/1971 | Burrin ...................................... 428/429 |
| 3,666,614 | 5/1972 | Snedecker et al. . |
| 4,960,631 | 10/1990 | Walters et al. . |
| 5,766,755 | 6/1998 | Chaussade et al. . |

FOREIGN PATENT DOCUMENTS

0 298 485   1/1989   European Pat. Off. .

*Primary Examiner*—Carl D. Price
*Attorney, Agent, or Firm*—Oblon, Spivak, McClelland, Maier & Neustadt, P.C.

[57] ABSTRACT

The invention relates to a laminated glazing panel having at lest two sheets of glass and to a manufacturing process. According to the invention, this glazing panel has sheets of glass have undergone a strengthening treatment and at least two sheets of the glass are separated by a silicone interlayer. The invention also pertains especially to the use as a window of a vessel in which there is a high pressure and/or a high temperature and/or a high moisture content, as well as to the mounting of the said window.

14 Claims, 3 Drawing Sheets

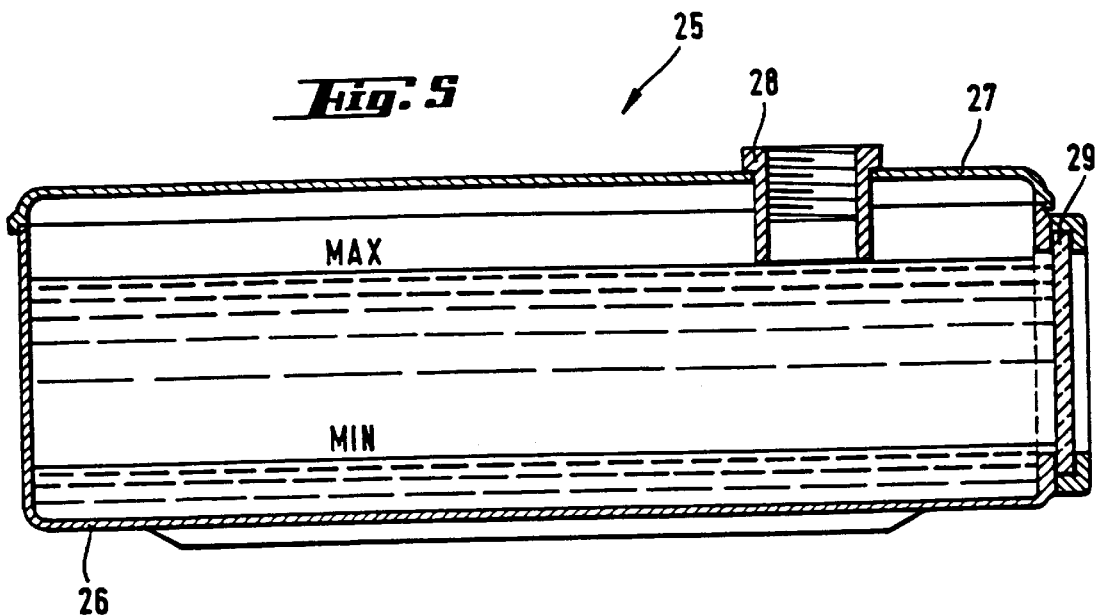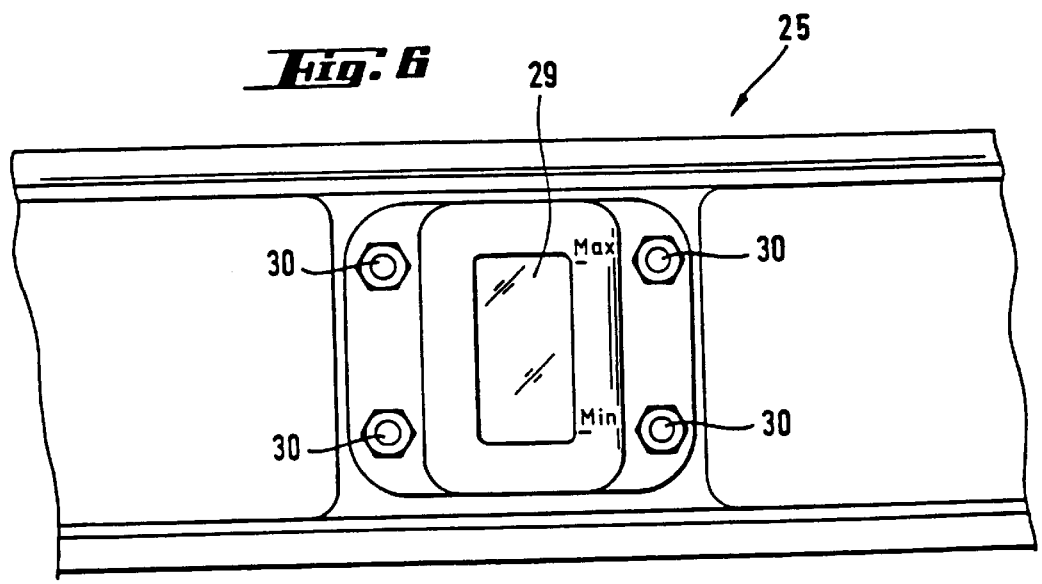

LAMINATED GLAZING PANEL, METHOD FOR MAKING SAME, AND METHOD FOR MOUNTING AND USING SAID GLAZING

BACKGROUND OF THE INVENTION

1. Field of the Invention

The present invention relates to a laminated glazing panel, comprising at least two sheets of glass, and to its manufacturing process.

2. Discussion of the Background

The invention will be more particularly described in the case of use as a window for a vessel for cooking under pressure, such as a pressure cooker, but it is not limited to such an application; a glazing panel according to the invention may also be used as a window pane or window for vessels where one or more of the following properties may be required: withstanding pressure and, temperature and moisture resistance. The glazing panel according to the invention may also be used under conditions requiring none of these properties.

The glazing panel according to the invention may especially be used as a window pane or window for an integrated or external steam generator which can be used for a multitude of appliances, especially domestic appliances such as irons, steam cleaners, steam ovens, etc.

Although it is not usual to find windows on pressure cookers, it turns out that consumer demand has led manufacturers of these devices to devise such an improvement. This improvement, or more precisely this change, allows the consumer to monitor the food during cooking and also enables him to satisfy his curiosity since he can see the rapid change in the cooking of the food, this change normally being invisible since this type of device is impervious to light.

Such a change in these devices has already been proposed, especially in European Patent Application 298,405. This document describes a lid for a vessel for cooking under pressure suitable for closing or sealing off a cooking appliance of the pressure-cooker type. According to this document, the lid includes an opening closed off by a glazing panel composed of two sheets of glass bonded to each other by a bonding product based on a transparent polybutadiene synthetic rubber. The lid presented in this document enables the inside of the appliance to be seen, but the extent of this remains very limited; this is because it appears that, in use, the device proposed only enables the production of windows having a limited diameter, allowing only very limited viewing. The approach of one's face limits the passage of light. These restricted dimensions are especially due to limited mechanical properties of the glazing panel. This document provides solutions, especially described in FIGS. 19 and 20, which get round the problem of a lack of light either by creating a second window, through which light penetrates, or by installing an electrical device which illuminates the inside of the vessel. Either of these solutions is highly advantageous, but enormously complicates the production of the appliance and considerably increases the manufacturing costs.

Moreover, it appears that at high temperatures the glazing panel forming the window deteriorates. The term "high temperatures" is understood to mean temperatures which are greater than the normal use temperatures but which may in particular be reached during misuse, for example when there is no water present. Deterioration of the glazing panel is in fact a problem more directly associated with the bonding layer based on polybutadiene synthetic rubber since, when such temperatures are reached in the cooking appliance, the bonding layer becomes brownish in color and crazes. Its function, which is to allow one to look into the appliance, is therefore no longer fulfilled. Replacement of the window is then necessary and therefore leads to an additional cost. Moreover, this replacement is obviously not a simple operation and requires the article to be returned to the factory, an operation costly in terms of time and money; it is clear that such a window requires special and rigorous mounting in order to be able to withstand the pressures which may prevail in the cooking appliance.

SUMMARY OF THE INVENTION

The subject of the invention is a glazing panel having, in particular, adequate pressure-resistant, temperature-resistant and moisture-resistance properties, especially for use as a window for a pressure cooker, and overcoming the problems mentioned above, especially by exhibiting adequate mechanical properties in order to be produced in a size large enough for the envisaged use. Another intended use of this glazing panel is that of a glazing panel for a steam generator enabling the water level inside the vessel to be seen.

This subject is achieved according to the invention by a laminated glazing panel comprising at least two sheets of glass separated by an insert, said sheets of glass having undergone a strengthening treatment, and at least two of said sheets of glass being separated by a silicone interlayer.

Production of such a glazing panel enables this to be used as a viewing screen, for example on the lid of a pressure cooker or on a wall of a steam generator, without running the risks mentioned above, especially with regard to temperature increases not conforming to proper use of the appliance. Furthermore, such a glazing panel also meets the pressure-withstand and moisture-resistance requirements for such an application.

Moreover, the glazing panel according to the invention exhibits mechanical properties sufficient for it to be produced in a size suited to use as a viewing screen for a pressure cooker. More precisely, and contrary to the case mentioned above, it is possible to produce it in any shape and with a size such that it allows one's face to be close to the window while still leaving enough room for light to enter so as to be able to see and monitor the cooking of the food. It is also conceivable to produce such a glazing panel with a size, at the very least a surface area, comparable to that of the lid, thereby making it possible to see the entire contents of the cooking vessel. Also with regard to the shape of the window, this may have a planar surface or a non-planar surface, and therefore may be a convex surface. In the latter case, the window may be in the form of a cone, sphere, cylinder, etc.

According to a first embodiment of the invention, the silicone interlayer is based on a one-component air-curing acetic silicone. Production of the glazing panel according to this embodiment may be regarded as being satisfactory but it can lead to a relatively long production time and therefore to high manufacturing costs. This is because, during production of the glazing panel, the one-component silicone is deposited on one of the sheets of glass in order to be covered by the second; and during the curing phase of the silicone, the area of exchange between the silicone and air is limited to the edge of the silicone layer, that is to say to that part of the silicone layer visible at the periphery of the glazing panel. Because of the small thickness of the said interlayer, this exchange area is limited and therefore leads to long polymerization times which increase with the area of the glazing.

In order to avoid this concern, it is proposed in a second preferred embodiment of the invention to choose a two-component silicone. The silicone thus crosslinks more simply and leads to a very homogeneous layer contrary to the first embodiment in which concentric rings may appear, the curing rate varying with the distance from the edge of the glazing panel.

Preferably, and in order to reinforce the adhesion of the silicone interlayer to the glass, provision is made to deposit beforehand an adhesion primer on those faces of the sheets of glass which come into contact with the said interlayer.

Provision is also advantageously made to keep the sheets of glass apart by the presence of spacers having a thickness of at lease 0.25 mm and preferably of at least 0.30 mm. Such a thickness produces, on the one hand, a homogeneous interlayer and promotes, on the other hand, the crosslinking of the two-component silicone.

With regard to the strengthening of the sheets of glass, this is preferably carried out by thermal toughening in respect of the sheets of glass having an outwardly oriented face and by chemical toughening in respect of the sheets of glass of which both faces are internal; For example in the case of a laminated glazing panel comprising three sheets of glass, the two external sheets are thermally toughened while the sheet in the middle is chemically toughened. The thermal toughening induces compressive surface stresses in the sheets of glass, these stresses being relatively deep and allowing, even in the case of accidental scratching, the strengthening properties obtained by toughening to be maintained. The chemical toughening applied to the central sheets also induces compressive surface stresses, but over a smaller thickness. This smaller thickness is not a drawback, it being impossible for the faces of such sheets of glass to be subjected to any scratching. Moreover, should the glazing panel break, chemical toughening leads to the formation of relatively large sized pieces of glass. These large pieces make it possible, in the event of an accident, to hold together, by means of the silicone interlayers, the pieces of thermally toughened sheets of glass, said pieces being of a size less than those of the chemically toughened sheets of glass.

Although it is true that thermal toughening enables the mechanical properties of the sheets of glass to be maintained in the event of accidental scratching, it can in no way prevent this scratching. To do this, the invention provides, in a more expensive embodiment, for the deposition of a scratchproof layer on the external faces of the glazing panel. Such a layer is, for example, a DLC (Diamond-Like Carbon) layer deposited, for example, by CVD (Chemical Vapour Deposition), this having the advantage of being resistant to high temperatures.

Also preferably, the sheets of glass are shaped with a rounded profile which gives the sheets of glass better mechanical strength. This shaping is advantageously carried out with a fine grain and thus eliminates any risk of initiating defects of the flake or crack type. Elimination of any edge defect also produces uniform mechanical strength.

The invention also provides a process for manufacturing a glazing panel consisting of at least two sheets of glass separated from each other by spacers, in which a liquid adhesive layer is deposited on one face of at least one sheet of glass and the spacers are deposited on the said layer so that they adhere to the sheet of glass by the end of drying of the said layer. According to this process, it is thus possible to fix the spacers very simply before depositing the silicone interlayer and then a second sheet of glass.

According to a preferred embodiment of the invention, the liquid adhesive layer which has just been mentioned is a priming agent or adhesion primer which reinforces the adhesion of the silicone interlayer to the glass.

The invention also provides a method of fixing a glazing panel in the wall of a vessel, especially a vessel for cooking under pressure, such as a pressure cooker, or a steam generator, in which the glazing panel is held in place by a peripheral seal compressed by a peripheral clamp.

According to a preferred embodiment, and more particularly in the case of vessels in which there may be a high pressure, the glazing panel is fixed, by bearing via the said seal, to the face of the wall oriented towards the inside of the vessel.

BRIEF DESCRIPTION OF THE DRAWINGS

Further details and advantageous characteristics of the invention will emerge below from the description of embodiment examples of the invention with reference to FIGS. 1, 2 and 3 which represent:

FIG. 5, a cross-sectional side view of a vessel comprising a glazing panel;

FIG. 6, a front view of the vessel in FIG. 5.

DESCRIPTION OF THE PREFERRED EMBODIMENTS

Figure 1:
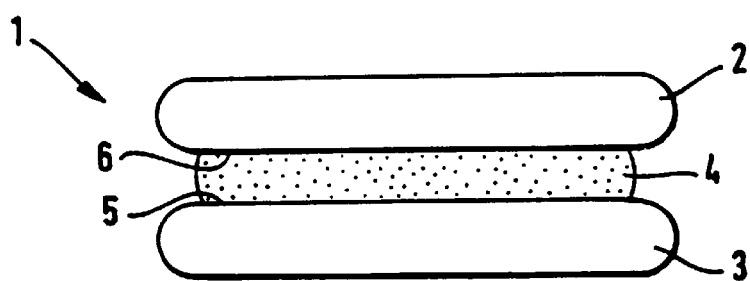
FIG. 1, a side elevation of a glazing panel according to the invention.

FIG. 1 shows a laminated glazing panel 1 according to the invention, consisting of two sheets of glass 2, 3 separated by a silicone interlayer 4. As mentioned previously, the shape of such a glazing panel may be of a different type and be chosen depending on the size and design of the cooking appliance in question. In the case shown especially in FIG. 2, the chosen shape is a circle whose size is such that it allows one's face to be close to the window while letting the light pass through in order to be able to look into the inside of the appliance.

Before assembly, the sheets of glass 2, 3 are prepared beforehand; first of all, the periphery is shaped so that it has a rounded profile which eliminates any risk of initiating defects, such as a flake or crack. The shaping thus improves the mechanical properties of the sheets of glass. The shaping is carried out with a fine grain, that is to say between 170 and 200 microns. The radius of the shaped profile on the edge of the sheets depends on their thickness. It is, for example, equal to 3 mm for a thickness of 4 mm or equal to 3.5 mm for a thickness of the glass sheet equal to 5 mm. Next, the sheets of glass 2, 3 undergo a thermal toughening treatment in order to improve their mechanical strength by creating compressive surface stresses. Strengthening by thermal toughening enables the mechanical properties to be maintained even in the case of accidental scratching; this type of scratching may especially be caused during cleaning by the user if he employs too abrasive an implement. This scratching remains within the realm of accidents since the manufacturer will warn the user, especially by means of the operating instructions. According to the invention, if such an accident occurs, the function of a window will be lost since the inside of the vessel will no longer be able to be seen during cooking, but the cooking nevertheless will be able to continue, the glazing panel maintaining its properties and thus meeting the standards pertaining to the use of a pressure cooker.

Figure 2:
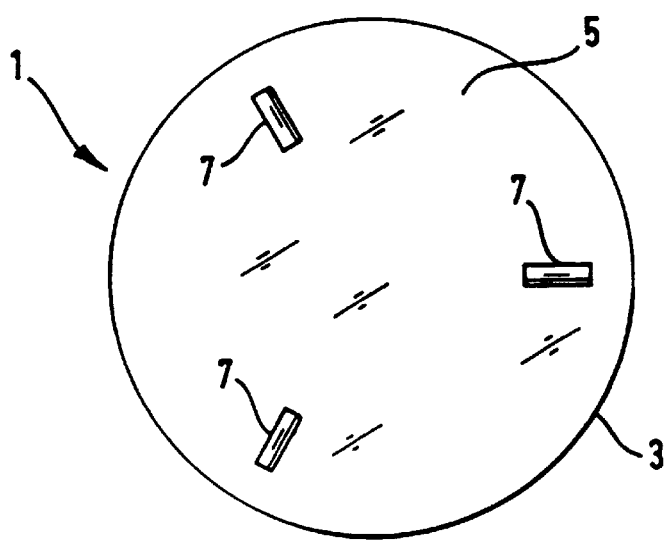
FIG. 2, a plan view of a glazing panel according to the invention during production.

An adhesion primer is deposited on one face 5, 6 of each of the sheets of glass 2, 3 thus prepared. The faces 5, 6 are, of course, the faces intended to come into contact with the silicone interlayer 4. An adhesion primer is, for example, the one sold by General Electric under the reference SS 4120. This is deposited on the glass in the form of a liquid, for example using a brush or a roller, so as to form, after drying, a layer having a thickness of less than one hundredth of a millimeter and more precisely about 5 microns. Drying of the adhesion primer at ambient temperature takes about one hour. Immediately after having deposited the adhesion primer and before drying it, spacers 7 are deposited on the surface 5 of one of the two sheets of glass 3 as shown in FIG. 2. The spacers are distributed relatively uniformly on the edges of the surface 5.

In the case shown of a circular surface 5, there are three spacers, these being placed along radii of this circle every 120°. The function of these spacers 7 is essentially to maintain a uniform space between the two sheets of glass 2, 3 and therefore, on the one hand, to keep the two sheets 2, 3 parallel and, on the other hand, to produce an interlayer having an even thickness. This arrangement may especially prevent viewing distortions caused, for example, by refraction of the light. The spacers 7 are advantageously placed along the border of the glazing panel in order to avoid disrupting the view through it. In addition, they may be completely masked by the presence of a seal going around the glazing panel and contributing to the fixing thereof.

The spacers may be of any shape, these possibly being balls, cubes, cylinders, etc.

In one embodiment of the invention, provision is made, for example, to deposit three spacers along the radii of the circle every 120°, these having the shape of needles, for example metal needles, so that they extend beyond the periphery of the glazing panel during assembly. According to this embodiment, after assembly the spacers or needles exhibit a region trapped within the glazing panel, said region acting as a spacer, and a region outside the glazing panel.

After the interlayer has cured, it is possible to remove these needles, for example by pinching hold of the external region and by pulling on this emerging end using an appropriate tool. The glazing panel thus obtained does not have any spacer, these having simply served during polymerization of the interlayer.

In the case of FIG. 2, the spacers are cylinders having a diameter of 0.35 mm and thus guarantee a thickness of the silicone layer equal to their diameter. Moreover, this thickness allows good crosslinking of the two-component silicone, which will be mentioned below.

After the adhesion primer has dried, the interlayer is formed from a two-component silicone. This is, for example, the product sold by General Electric under the reference RTV 615. To use it, the two components resulting in a silicone adhesive are firstly mixed together, this being followed by a bubble-removal step so as to obtain a perfect optical quality after assembling the laminated glazing panel according to the invention.

In order to produce the interlayer proper, a drop of the adhesive thus obtained is deposited, in excess, at the center of the face 5 and then pressed using the second sheet of glass 2 which bears on the spacers. In one embodiment, in the case of a circular glazing-panel surface, it is possible to deposit a drop of silicone adhesive at the center of the surface 5 of the sheet of glass 3 already covered with the adhesion primer and with the spacers, then to spread out this drop, deposited in excess, by centrifuging and finally to cover it with the second sheet of glass 2. In any of the methods of forming the interlayer and the assembly, it is possible to automate the operations, especially because of the low viscosity of the silicone adhesive which allows precise metering using an automatic dispenser. Curing of the silicone adhesive is then carried out in two steps. First of all, the crosslinking is initiated at room temperature, for approximately four hours. Then the curing is accelerated, in an oven, so as to obtain the required properties of the interlayer. This second step is, for example, carried out at 65° C. for approximately four hours.

Moreover, the invention advantageously makes provision to deposit the cylindrical spacers 7 so that the axis of the cylinder is coincident with a radius of the circle. In this way, during spreading of the silicone adhesive over the surface 5, the spacers present as small as possible a surface of resistance to the flow of the spreading material, that is to say corresponding to the base of the cylinders. It is thus possible to avoid any risk of disbondment of the spacers 7 during passage of the flow of material thereat. The choice of a cylindrical shape also contributes to good retention of the spacers during passage of the flow of material. This is because this shape and its positioning provide a greater surface tension effect than those obtained with spacers of different shapes.

Figure 3:
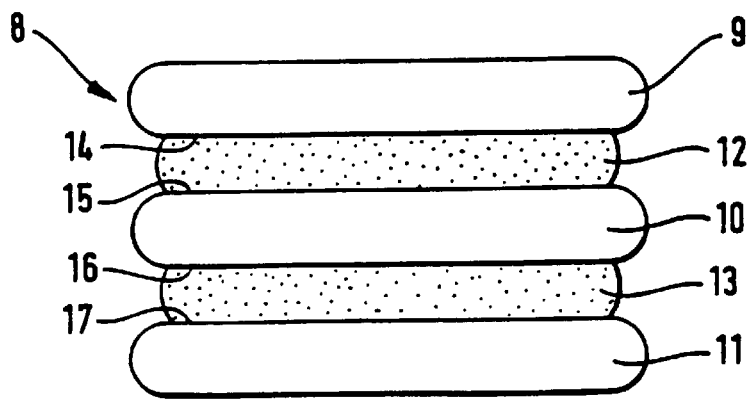
FIG. 3, a side elevation of another glazing panel according to the invention.

FIG. 3 shows another example of a glazing panel according to the invention. The glazing panel 8 is composed of three sheets of glass 9, 10, 11 and of two silicone interlayers holding them firmly against each other. As in the previous case, the three sheets of glass 9, 10, 11 have undergone edge shaping, giving the edges a rounded profile. Next, the three sheets of glass are toughened. The sheet of glass 10, internal to the glazing panel, is chemically toughened. This toughening improves its mechanical properties by creating compressive surface stresses. This toughening therefore improves the mechanical strength of the sheet of glass 10, and consequently that of the glazing panel 8, and moreover leads to relatively coarse pieces should the said sheet 10 break. These pieces can retain, by means of the interlayers 12 and 13, the smaller sized pieces of the sheets 9 and 11, the sheets of glass 9 and 11 undergoing a different type of treatment in order to strengthen them; in fact, the two outer sheets 9 and 11 undergo thermal toughening which also creates compressive surface stresses, but over a greater depth. This characteristic makes it possible in the case of scratching, especially on the external faces of the glazing panel 8, to maintain the strengthening properties obtained. Scratches which may arise by excessively severe cleaning do not pass beyond the depth of the compressive surface stresses obtained by thermal toughening, and therefore do not modify the strengthening obtained.

Next, the adhesion primer is deposited on the faces 14, 15, 16, 17 of the three sheets of glass. While the primer on the faces 14 and 16 of the sheets of glass 9, 11 is drying, the spacers are deposited. Next, assembly takes place by forming in succession the two silicone interlayers 12, 13, as described in the previous case. Compared to the previous case, the glazing panel 8 thus formed exhibits mechanical properties, especially an increased mechanical strength, which allow even greater window sizes to be envisaged.

Tests have been carried out, especially on a glazing panel manufactured according to the embodiment shown in FIG. 1, that is to say a glazing panel consisting of two sheets of glass separated by a silicone interlayer. The mechanical strength, especially the impact strength or the pressure withstand, is satisfactory; the good tear strength of the silicone interlayer in particular improves the mechanical properties. Tests were also carried out in order to check the temperature withstand and the moisture resistance. The results are completely satisfactory under the normal conditions of use of a pressure cooker. Moreover, tests simulating improper use of the pressure cooker, especially through a large temperature rise, were also carried out.

For example, the glazing panel was heated to 250° C. for 1 in a force-convection oven, the temperature rise taking place in 20 minutes; all the results obtained show that the glazing panel according to the invention shows no sign of weakness and maintains its function, that is to say its transparency. The same tests were carried out on a glazing panel as described in Document EP 298,485; crazes very rapidly appeared in the interlayer, which became brownish. The viewing screen function was therefore lost and, in addition, the glazing panel of Document EP 298,485 became weaker, the sheets of glass possibly becoming disconnected.

Figure 4:
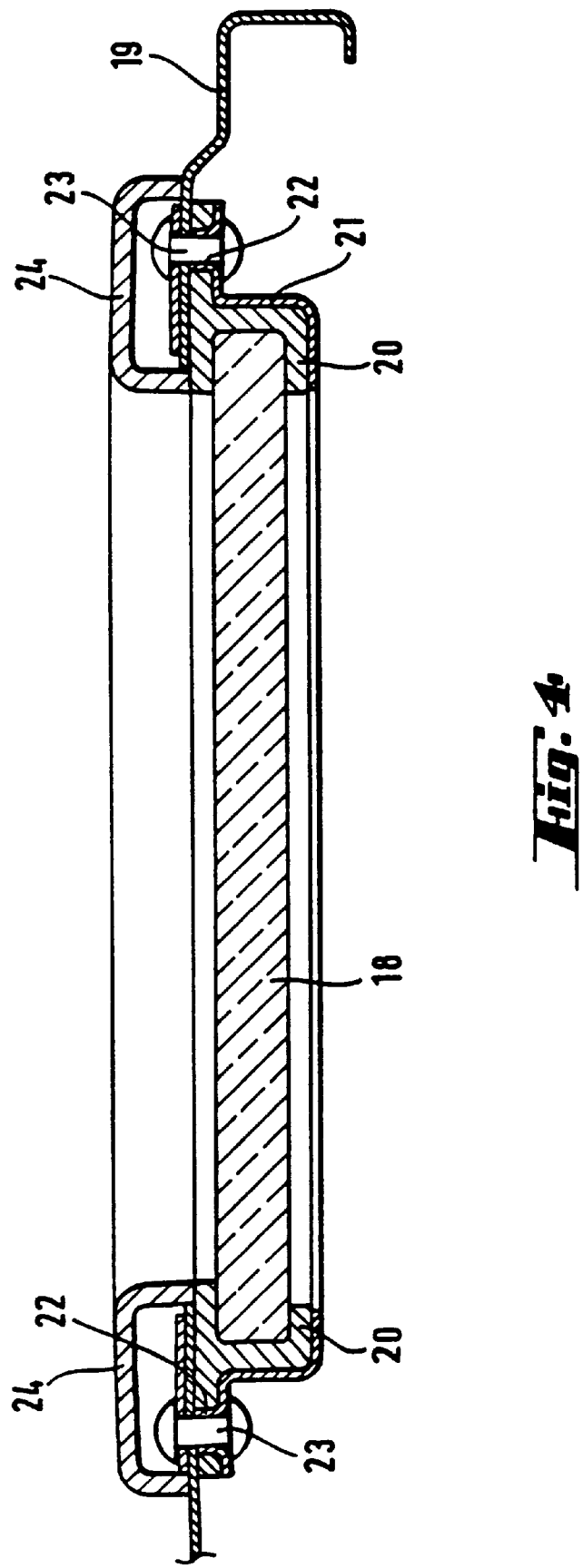
FIG. 4, a diagram of a cross-sectional view of a mounting on the wall of a vessel.

FIG. 4 illustrates a method of mounting a window 18 in a wall 19 of a vessel for cooking under pressure, such as a pressure cooker. The window 18 is sealed with respect to the wall 19 by the compression of a seal 20 whose profile has approximately the shape of an h, the window 18 being inserted between the legs of the h.

The tall height of the cross-section of the seal 20 is pressed against that face of the wall 19, oriented towards the inside of the cooking vessel, but with an orifice smaller than that of the window 18.

The window is pressed against the seal by means of a peripheral clamp 21 which transfers its force onto the short leg of the h (cross-section of the seal).

Compression of the seal is controlled by the interposition of a spacer 22 in line with each rivet 23 between the inner face of the wall 19 and that of the clamp 21.

Having mounted the window 18, a cover 24 is provided on the external face of the wall 19. This cover 24 thus makes it possible to conceal the mounting region in the visible face of the wall 19 of the vessel. In the case of a pressure cooker, this wall 19 is advantageously the lid.

FIG. 4 illustrates a mounting of a window in the face of a wall oriented towards the inside of the vessel; such a mounting gives, in particular, good strength to the mounting in the case of high pressures in the container.

However, the invention is not limited to such a mounting and it also provides for mounting of the window in the face of a wall oriented towards the outside of the vessel.

Such an embodiment is shown in FIGS. 5 and 6 which illustrate a vessel such as a steam generator.

In FIG. 5, this steam generator is shown in cross-section, from the side. The vessel 25 is especially composed of a bottom part 26 and a lid 27 which has an orifice 28, for example for filling. A window 29 is fixed to a side wall of the bottom part 26.

FIG. 6 shows in greater detail the advantage of such a window 29 which can, for example, enable the filling level of the vessel to be seen. Also shown in this FIG. 6 is a part of the system for fixing the window 29 to the wall of the bottom part 26; the presence of four fixing elements, such as rivets 30, may in fact be seen.

The glazing panel according to the invention can therefore be used as a viewing screen for a vessel for cooking under pressure, such as a pressure cooker, or for another device, such as a steam generator or an installation which may or may not require its mechanical properties, of temperature withstand and moisture resistance. In particular, its mechanical properties allow the production of relatively large glazing panels for viewing-screen applications, for example for a pressure cooker, giving a very extensive view of the contents of the vessel.

Obviously, numerous modifications and variations of the present invention are possible in light of the above teachings. It is therefore to be understood that within the scope of the appended claims, the invention may be practiced otherwise than as specifically described herein.

What is claimed is:

1. Laminated glazing panel comprising:

at least two sheets of glass separated by an interlayer, wherein the sheets of glass comprise glass sheets which have undergone a strengthening treatment and a silicone interlayer pivotal which separate at least two of said sheets of glass wherein the strengthening of the glass sheets is carried out by thermal toughening of first and second sheets of the glass sheets having an outwardly oriented face and by chemical toughening with respect to a third sheet of said sheets of glass which is positioned between said first and second sheets of glass.

2. Glazing panel according to claim 1, wherein the silicone interlayer is based on a one-component acetic silicone which polymerizes in air.

3. Glazing panel according to claim 1, wherein the silicone interlayer is a two-component silicone.

4. Glazing panel according to claim 3, wherein the interlayer adheres to the sheets of glass via an adhesion primer.

5. Glazing panel according to claim 1, wherein each said external face of the glazing panel has scratch-proof layers.

6. Glazing panel according to claim 1 wherein at least one of the sheets is shaped so as to have a rounded profile.

7. Glazing panel according to one of the preceding claims, wherein the sheets of glass are spaced apart by the presence of spacers such that they have a thickness of at least 0.25 mm and preferably of at least 0.30 mm.

8. A glazing panel according to one of claims 1 to 4, 5 and 6 wherein said sheets of glass comprise a window of a vessel having a high pressure and/or a high temperature and/or a high moisture content.

9. Process for manufacturing a glazing panel having at least two sheets of glass separated from each other by spacers, which comprises depositing a layer of liquid adhesive on at least one face of one of said at least two sheets of glass, depositing the spacers on said layer;

fixing said spacers by drying said layer; and strengthening said sheets by thermally toughening first and second sheets of said at least two sheets of glass and chemically toughening a third sheet of said sheets of glass positioned between said first and second sheets of glass.

10. Process according to claim 9, when the glazing panel comprises at least two sheets of glass bonded to each other by the combination of a priming agent and a silicone interlayer, wherein the silicone interlayer is deposited after being separated by the spacers.

11. Method of fixing a glazing panel in the wall of a vessel, which comprises:

depositing a layer of liquid adhesive on at least one face of a sheet of glass;

depositing the spacers on said layer;

fixing said spacers by drying said layer;

strengthening said sheets by thermally toughening first and second sheets of said sheets of glass;

chemically toughening a third sheet of glass positioned between said first and second sheets of glass; and holding the glazing panel in place by a peripheral seal compressed by a peripheral clamp.

12. Method according to claim 11, which comprises fixing the glazing panel by bearing; via the said seal, the glazing panel against a face of a wall oriented towards an inside portion of the vessel.

13. A vessel for cooking under pressure, a pressure cooker, having a glazing panel which formed by the method claimed in either of claims 11 and 12.

14. Steam generator having a glazing panel which which is formed according to the method claimed in either of claims 11 and 12.

* * * * *